United States Patent
Fung et al.

(10) Patent No.: US 8,940,363 B2
(45) Date of Patent: Jan. 27, 2015

(54) PREPARATION OF HOLLOW POLYMER MICROSPHERES

(75) Inventors: Dein Run Fung, Taipei (TW); Sen Huang Hsu, Taipei (TW); Chih Hsun Liu, Taipei (TW); Hsu Ming Cheng, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 13/588,068

(22) Filed: Aug. 17, 2012

(65) Prior Publication Data

US 2014/0050845 A1  Feb. 20, 2014

(51) Int. Cl.
*B05D 7/24* (2006.01)
*B05D 1/36* (2006.01)

(52) U.S. Cl.
USPC .................................................. 427/213.34

(58) Field of Classification Search
CPC .................................... B05D 7/24; B05D 1/36
See application file for complete search history.

(56) References Cited

U.S. PATENT DOCUMENTS

2009/0162558 A1* 6/2009 Bardman et al. .............. 427/384

\* cited by examiner

*Primary Examiner* — Randy Gulakowski
*Assistant Examiner* — Jeffrey Washville
(74) *Attorney, Agent, or Firm* — Bacon & Thomas, PLLC

(57) ABSTRACT

The present invention of three-stage process relates to preparing hollow particles with a buffer layer, exhibiting integrity of particle structure and uniformity of particle size, used in plastic or paper coating, and showing superior characteristics of gloss, whiteness, high opacity, high printing color density and good water resistance.

3 Claims, No Drawings

PREPARATION OF HOLLOW POLYMER MICROSPHERES

FIELD OF THE INVENTION

The present invention of three-stage polymerization process relates to a seeded emulsion polymerization, characterized in that the core layer of a seed emulsion is first prepared, and then the buffer layer is manufactured, the outer layer is coated with a shell polymer, and finally it is swelled by an alkali to procure hollow microspheres having a buffer layer with a porous structure.

BACKGROUND OF THE INVENTION

Polymer microspheres prepared by the present invention have a hollow structure, the preparation methods of this type of polymer have been quite described in literatures and patents, the most commonly used emulsion polymerization reaction is via a two-stage core/shell emulsion reaction to get a polymer hollow microsphere emulsion, such as those revealed in U.S. Pat. Nos. 5,494,971 and 6,252,004, and on the other hand, to improve the temperature resistance, ROC Patent No. 1312355 describes that core cross-linking/shell without cross-linking or core/shell cross-linking are conducted in a two-stage preparation of hollow particles, the best situation is that the core is not cross-linked, while the reaction step of shell encapsulation is cross-linked. But its shortcomings: in the former, owing to core cross-linking, the core is not easy to turn into the hollow shape of core/shell particles in alkali swelling, in the latter, due to the particle core/shell interface compactness is loose and there is no intermediate buffer layer, in the follow-up process of alkali swelling, due to osmotic pressure, alkali molecules go into the internal core-shell particles and neutralize with the acidic core, and meanwhile the mutual repulsive interaction among ionic charges, and the hydrophilic property of the carboxyl ion is much larger than that of carboxylic acid, which has led to the molecular chain to migrate to the water external to particles, thus the particle size is further expanded, but due to hydrophobic and cross-linking processing to repel the increasing particle size, two kinds of inside and outside forces have been formed and squeezed continuously in the outer shell polymer. In addition, because the alkali molecules and the acidic cores conduct the neutralization reaction between acid and alkali to form ionic salts having a dissolution effect resulting in a structure of the hollow particles, and the particle shell is further thinned, and can not afford the aforementioned inside and outside pressure squeeze stress that leads to the hollow particle breakage. Because of the above mentioned two contradictions, it is difficult to synthesize the hollow particles with both the particle size and the hollow degree in accordance with demand and without damage.

SUMMARY OF THE INVENTION

For this reason, the purpose of the present invention is to provide a three-stage polymerization process, characterized in that a porous sponge structure-like buffer layer in the second stage is provided to prepare microspheres having a proper radius of a hollow body and an overall particle size to meet the design requirements used in the coating of plastic or paper substrates, the resulted coating shows brightness, whiteness, opacity, and has characteristics of good printing color density, and good printing water resistance. Meanwhile the product characteristics of the present inventive polymer microsphere emulsion are low foaming properties which are advantageous to the rapid coating processing, and the intact particle structure which leads to a low breakage rate.

The present inventive three-stage reaction process sequence is described as follows:

The first stage is the preparation of the core layer: the main purpose is to effectively control the particle size of the latex particles in order to achieve the desired radius size of the hollow body, at the same time the said latex particles are used as a seed in order to facilitate the future buffer layer and the shell layer segment growth to form complete particles. The preparation process of the core layer is via a reaction commonly referred to as a seed emulsion polymerization, the said seed emulsion polymerization makes use of acrylic monomer, persulfate initiator, and anionic, nonionic or reactive emulsifier, wherein the stirring speed and the emulsifier amount have a significant impact on the core number during reaction. The semi-continuous feeding mode and the control of the dropping speed and time are used to reach the desired size of the core layer.

The second stage is the preparation of the encapsulation buffer layer: an acidic buffer layer containing a porous sponge-like structure is mainly formed, the said acidic buffer layer is the base of the follow-up holes formation, and the key step for the manufacture of hollow particles having the buffer layer. The acidic buffer layer is made from acrylic monomers and cross-linkable bi-functional acrylic monomer, in addition to the cross-linking reaction of the mixed monomers, a cross-linking reaction takes place between the seed emulsion and the bi-functional monomer with persulfate as an initiator to prepare acidic polymer particles, the core polymer having a desired thickness of the buffer layer can be obtained by adjusting the dosage ratio of the seed and the mixed monomers.

The third stage is the shell encapsulation and alkali swelling steps: acidic core particles having a buffer layer are encapsulated by a hydrophobic mono-vinyl monomer, and the core-shell thereof is cross-linked with bi-, tri- or more functional groups of acrylic acid monomer, a cross-linking agent is used to form a cross-linked structure which constrains the mutual diffusion of the core-shell chain during encapsulating, the encapsulation efficiency of the monomer on the acidic core is improved, finally the weakly polar or non-polar shell is encapsulated on a stronger polar acidic core, i.e. the acidic core is encapsulated with a hydrophobic shell.

Alkali treatment temperature have a major impact on the latex particle morphology, the processing temperature is 40 to 90° C. depending on the type of shell monomers, alkali goes through the shell layer of the latex particles and is reacted with the inside carboxyl group to form a hydration-easy hydrophilic layer, which is the root cause of the latex particle size swelling. It is very favorable that the alkali treatment temperature is higher than the glass transition temperature of the outer shell polymer, wherein core-shell polymer particles can be effectively to deal with the swelling treatment. The high temperature alkali treatment conditions provide the energy for alkali molecules diffusing into carboxyl core. Alkali molecules enter inside the core-shell particles and neutralize the acidic core and are reacted with the carboxyl group to increase the degree of ionization, and the mutual repulsion between the charges and the hydration lead to a molecular chain migration to the external part of particles. The hydrophilic chain with carboxyl group also tends to reach into the water phase, and thus the particle size is further expanded, alkali molecules and carboxyl nuclei interact to promote the colloidal volume to expand continuously, and ultimately the internal particle swells into a hollow shell to form a shell layer having a sponge-like morphology, then cooled to be room temperature after colloidal particles are full expanded.

A pre-emulsion dropping method is used in the above mentioned three-stage emulsion polymerization, the emulsion product shows stability, and the particle size dispersion is good. This is because the pre-emulsion dropping method provides a very strong polarity, highly water-soluble monomer MAA and other monomers, wherein the monomers and the emulsifier are mixed very evenly, the emulsion polymerization stability is greatly improved, so that the polymerization process is smooth, the reaction is uniformly exothermic, easy to control, with reducing the amount of condensates, and reducing the formation of the wall scale. In addition, the pre-emulsion dropping method is a continuous starvation-type feeding method, i.e., the system monomer is always in a state of "starvation", meanwhile the initiator is added batch-wisely to control the concentration thereof in the system, so that the hydrophobic shell monomer forms a polymer on the shell to avoid effectively the formation of new colloidal particles.

Adding the cross-linking agent in the preparation of the acidic core is one of the characteristics of the present invention, in the past two stages of hollow particles preparation, the cross-linking agent is only used in shell-encapsulation reaction step, the drawback is a high hollow particle breakage rate after alkali swelling in the alkali-swelling process due to the loose core/shell interface compactness, thereby the subsequent use performance is affected. A three-stage polymerization (i.e., three stages of the emulsion polymerization including core, buffer layer, shell) is applied in the present invention, wherein a cross-linking agent is incorporated in the preparation of the acidic buffer layer, the said cross-linking agent will increase the strength of the core/shell interface, and by the control of core size and the thickness of the buffer layer, the particle does not collapse during the alkali swelling process and maintain the pore size integrity of hollow particles, thereby it is difficult to break during drying.

DETAILED DESCRIPTION OF THE PREFERRED EMBODIMENT

A three-stage latex polymer emulsion method is adopted for the present inventive polymer microsphere emulsion preparation and the structure control, which is favorable to control the particle size uniformity, and improve water resistance, colorability and gloss during printing. The three-stage latex polymer emulsion method is approached as follows:

1) Preparing the core layer: a general so-called seed emulsion polymerization is used for the preparation of the core layer, the said seed emulsion polymerization includes acrylic monomers (as a monomer), an emulsifiers and a water-soluble free radical initiator for the emulsion polymerization. The used acrylic acid (ester) based monomer is selected from the group consisting of methyl acrylate, methyl methacrylate, ethyl acrylate, butyl acrylate, methyl butyl acrylate, acrylic acid ethyl hexyl ester, mono-methyl maleate, mono-methyl itaconate, mono-methyl fumarate, acrylic acid, methacrylic acid, propyleneoxy propionic acid, methacryloyl propionic acid, propyleneoxy acetic, methyl propyleneoxy acetic acid, crotonic acid, itaconic acid, aconitic acid, maleic acid, maleic anhydride, fumaric acid, and mixtures thereof. Suitable water-soluble free radical initiators include hydrogen peroxide; tert-butyl peroxide; alkali metal persulfates such as sodium, potassium and lithium persulfate; ammonium persulfate; and mixtures of such initiators, to be accompanied with a reducing agent, this reducing agent includes: sulfite, such as alkali metal metasulfite, hydrosulfite and hyposulfite; formaldehyde/sodium hydrosulfite; and reducing sugar such as ascorbic acid and iso-ascorbic acid, etc. The dose of initiators is based on the total amount of the acrylic monomer, the appropriate weight percentage is 0.01 to 3%, and one or more anionic, nonionic or reactive emulsifiers or surfactants can be used, which includes tert-octylphenoxyethyl poly(39)-ethoxyethanol, dodecyloxy poly(10) ethoxyethanol, nonyl phenoxyethyl-poly(40) ethoxyethanol, polyethyleneglycol (2000) mono-oleate, hydroxyethylated castor oil, fluorinated alkyl esters and alkyl oxide, polyethylene oxide (20) Sorbitol monolaurate, sucrose monococoate, bis(2-butyl) phenoxy poly(20) ethoxyethanol, hydroxyethyl cellulose polybutyl acrylate graft copolymer. Suitable examples of anionic emulsifiers include sodium lauryl sulfate, sodium dodecyl phenyl-sulfonate, potassium stearate, sodium dioctyl sulfosuccinate, dodecyl diphenyloxy disulphonate, ammonium nonyl phenoxyethyl poly(1) ethoxyethyl sulfate, sodium styryl sulfonate, sodium dodecyl allyl sulfosuccinate, linseed oil fatty acid, sodium or ammonium salt of ethoxylated nonylphenol phosphate, sodium octoxynol-3-sulfonate, sodium coconut creatinate, sodium 1-alkoxy-2-hydroxypropyl sulfonate, sodium α-olefin($C_{14}$-$C_{16}$)sulfonate, hydroxyl alkanol sulfate, tetra sodium N-(1,2-dicarboxylethyl)-N-octadecyl sulfosalicyloyl amine salt, N-octadecyl sulfosalicyloyl amino-acid disodium salt, disodium alkylamido polyethoxy sulfosuccinate, disodium ethoxylated nonylphenol sulfosuccinate half ester, sodium ethoxyethyl sulfate. The dosage of the emulsifier accounts for 0 to 3% by weight of acrylic monomer, its amount is less than 1% of acrylic monomer, the optimal amount is less than 0.5% by weight of acrylic monomer. The stirring speed and the emulsifier amount in the reaction process have a significant impact on the core number, while the semi-continuous feeding mode, the dropping speed and the time control can be controlled to achieve a desired size of the core layer and a particle size of 130~220 nm.

2) Preparation of the encapsulation buffer layer: the aforementioned core layer emulsion and an acrylate monomer and an acid functionalized acrylic monomer, and a bifunctional cross-linking agent are reacted for emulsion polymerization, wherein the emulsion particle size is 300~450 nm. A further emulsifier is not added in this stage, the emulsion solid content of the core layer accounts for 1 to 20%, preferably 1~10%, most preferably 2~5% of the total weight of the buffer layer, the acid functional acrylic monomer accounts for 10~90%, preferably 40~80%, most preferably 55~75% of the total weight of the buffer layer, the rest is acrylate monomers, wherein the acid functional acrylic monomer is a monomer selected from the group consisting of: acrylic acid, methacrylic acid, propyleneoxy propionic acid, methpropyleneoxy propionic acid, propyleneoxy acetic acid, methpropyleneoxy acetic acid, crotonic acid, itaconic acid, aconitic acid, maleic acid, maleic anhydride, fumaric acid, and mixtures thereof.

The acrylate based monomer is a monomer selected from the group consisting of methyl acrylate, ethyl acrylate, butyl acrylate, methyl methacrylate, butyl methacrylate, ethylhexyl acrylate, monomethyl maleate, monomethyl itaconate, and monomethyl fumarate. Bifunctional cross-linking agents account for 0.1 to 2 mole %, and most preferably 0.5 to 1.5 mole % based on the monomer amount for the encapsulation buffer layer, the cross-linking agent is selected from the group consisting of ethylene glycol diacrylate, ethylene glycol methyl acrylate, 1,3-butanediol diacrylate, 1,4-butanediol diacrylate, propylene glycol diacrylate, triethylene glycol dimethacrylate, 1,3-glycerol dimethacrylate, 1,1,1-Tris(hydroxymethyl) propane dimethacrylate, 1,1,1-Tris(hydroxymethyl)ethane diacrylate, divinylbenzene, vinyl methacrylate, vinyl crotonate, vinyl acrylate, and vinyl acetylene; but ethylene glycol dimethacrylate and divinyl benzene are most preferable.

3) Preparation shell encapsulation and alkali swelling: the exterior of the buffer layer acidic core is encapsulated with a hydrophobic shell, the solid content of the buffer layer accounts for 10~40%, preferably 10~20% by weight of the total solid content. A hydrophobic shell made from a non-ionic mono-ethylene monomer, and a cross-linking agent having bi-, tri-, or multi-functional groups are conducted in emulsion polymerization, and volatile alkali penetrates the expanding core to form an emulsion having a particle size of 950~1,000 nm with a homogeneous hollow structure. The non-ionic mono-ethylene monomer is selected from the group consisting of styrene, α-methyl styrene, vinyl toluene, ethylene, vinyl acetate, vinyl chloride, vinylidene chloride, and acrylonitrile. The cross-linking agent having bi-, tri-, or multi-functional groups accounts for 0 to 2 mole %, and most preferably 0.5 to 1.5 mole % of the shell encapsulation layer monomer content, the said cross-linking agent is selected from the group consisting of ethylene glycol diacrylate, ethylene glycol dimethacrylate, 1,3-butanediol diacrylate, 1,4-butanediol diacrylate, propylene glycol diacrylate, triethylene glycol dimethylacrylate, 1,3-glycerol dimethacrylate, 1,1,1-tris(hydroxymethyl)trimethylacrylate, 1,1,1-tris(hydroxymethyl)ethane triacrylate, pentaerythritol trimethylacrylate, 1,2,6-hexane triacrylate, sorbitol pentamethacrylate, methylene-bis-acrylamide, methylene-bis-methyl acrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl aminocyanide, ethylene glycol divinyl ether, etc.; the commonly used emulsifier for the shell encapsulation is the same as a core layer anionic emulsifier, preferably is sodium dodecylsulfate sodium dodecylbenzenesulfonate.

In the polymerization process of the buffer layer, a certain amount of a cross-linking agent must be added, in addition to the formation of a buffer layer, and mutual diffusion and penetration between the shell layer and the core layer of the polymer can prevented. Based on the experimental basic recipe, and remaining the amount of other components unchanged, the amount of the cross-linking agent in the core is changed, and the less the cross-linking agent used in the hollow polymer emulsion core layer, the larger the hollow diameter of the micro-spheres, and the thinner the shell wall will be. When the amount of the cross-linking agent is increased or the thickness of the buffer layer is elevated, the hollow micro-sphere shell layer becomes thicker, the parcels and the shape of the particles are more complete. When the amount of the cross-linking agent reaches 2%, owing to the over movement constraining to the polymer chain by the cross-linking agent, the latex particles is difficult to swell well, can not even get a shape-intact, morphology-clear hollow structure.

Another feature of the present invention is low foaming during the processing of the hollow latex particles, which is favorable for the fast coating production and the structural integrity of the particle with a low breakage rate. The three-stage seed core/shell emulsion polymerization method is used in the present invention, via adjusting the timing of the use of emulsifiers, the emulsion particle size can be controlled for improving foaming properties to achieve the effect of low-foaming, thereby to enhance the coating line speed and to increase the productivity. In the seed emulsion preparation, the amount of the emulsifier is particularly important, only if the emulsifier concentration in the polymerization process is controlled within a certain range slightly above the critical micelle concentration (CMC), then the emulsion having a stable uniform particle size can be procured. The preparation of the seed emulsion is based on the experimental formula, the amount of other components remains unchanged, only the amount of the emulsifier is changed, when the amount of the emulsifier is 0.3%, the emulsion is less stable, gels are generated during reaction, and the latex particle size is larger, the particle size distribution is wider, the emulsion particle size gradually decreases with increasing amount of the emulsifier, when the amount of the emulsifier is more than 1.0%, the latex particle diameter is too small, it is not conducive to the post-formation of a high hollow rate emulsion, therefore, the emulsifier preferably accounts for 0.5% to 1.0% of monomers in preparation of the seed emulsion; at the second stage of the acid-core particle preparation, no additional emulsifier is needed, the inherent characteristics of emulsifiers and acid monomers are favorable for achieving the stability of the emulsion; in the third stage of the shell encapsulation process, the emulsifier dosage is appropriately slightly above the CMC (critical micelle concentration) in order to maintain the stability of the emulsion and to reduce the emulsifier amount, so the product can reach low foaming effect, fast coating, productivity elevation.

The hollow latex particles obtained by the present invention are added to a water-based paint to have a concentration of 5 to 20 weight %, the paint is then coated on the substrate, through the drying process, it can improve surface brightness, whiteness, opacity, the printed color shows higher color density, and water resistance, etc., The coated substrate includes all kinds of paper, plastic, woven or non-woven, etc., the paint can also be added to latex paint, spray paint, powder coating etc., to be used as a filler to improve brightness, whiteness, opacity and so on of the coated surface.

EXAMPLES

The preparation and the structural control features of the inventive polymer microsphere emulsion are described in more detail by a number of examples, without restricting the invention in any way whatsoever.

Example 1

A monomer pre-emulsion composition comprising 60 g of deionized water, 1.5 g of sodium dodecyl benzene sulfonate, 20 g of methyl methacrylic acid, 40 g of methyl methacrylate and 280 g of butyl acrylate is prepared, on the other hand, an initiator solution comprising 60 g of deionized water and 5 g of ammonium persulfate is prepared readily for use, 2000 g of deionized water and 60.4 g of the monomer pre-emulsion are added to the reactor with nitrogen to get rid of air inside the reaction vessel, maintained at stirring under a nitrogen atmosphere and heated to 78° C., the ammonium persulfate initiator solution is completely added in 0.5 hours, at the same time, the remaining monomer pre-emulsion is added to the reactor in 1.5 hours, thereafter the reaction is maintained at 78° C. for 4 hours, then the resulted reaction mixture is cooled to room temperature, filtered to remove the coagulum to obtain a core layer seed emulsion having pH=2.3, an average particle size of 170 nm, and a solid content of 13.5%.

A monomer pre-emulsion is made of 3100 g deionized water, 175 g core layer seed latex, 490 g methyl methacrylic acid, 210 g methyl methacrylate and 7 g ethylene glycol dimethacrylate, on the other hand, an initiator solution composed of 70 g of deionized water and 8.4 g of ammonium persulfate is prepared readily for use; 1700 g of deionized water and 175 g of the seed emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 2 hours after the monomer is added, followed by cooling to room temperature, the coagulum is filtrated and removed, the encapsulated buffer layer emulsion having pH=2.3, an average particle size of 324 nm, and a solid content of 12.5% is produced.

A monomer pre-emulsion is made of 1,000 g of styrene, 12 g of ethylene glycol dimethacrylate and 3 g of sodium lauryl sulfate, on the other hand, an initiator solution composed of 300 g of deionized water and 10 g of ammonium persulfate is prepared readily for use; 2200 g of deionized water and 1,350 g of the encapsulation buffer layer emulsion are added to the reactor with nitrogen to get rid of air inside the reaction vessel under stirring in a nitrogen atmosphere and heated to 80° C., the monomer is incorporated in the reactor in 3 hours, at the same time, an ammonium sulfate initiator solution is added in 3.5 hours, the reaction is maintained at 80° C. for 1 hour after the addition of the monomer pre-emulsion, followed by heating to 90° C., adding 150 g of 9.3% ammonia water, cooling to 86° C., keeping at constant temperature for 2 hours, then cooling down to room temperature, filtrating to remove the coagulum, the hollow polymer particles having pH=9.5, an average particle size of 866 nm, and a solid content of 24.3% are procured.

Example 2

A monomer pre-emulsion comprising 60 g of deionized water, 1.5 g of sodium dodecyl benzene sulfonate, 20 g of methyl methacrylic acid, 40 g of methyl methacrylate and 280 g of butyl acrylate is prepared, on the other hand, an initiator solution comprising 60 g of deionized water and 5 g of ammonium persulfate is prepared readily for use, 2000 g of deionized water and 60.4 g of the monomer pre-emulsion are added to the reactor with nitrogen to get rid of air inside the reaction vessel, maintained at stirring under a nitrogen atmosphere and heated to 78° C., the ammonium persulfate initiator solution is completely added in 0.5 hours, at the same time, the remaining monomer pre-emulsion is added to the reactor in 1.5 hours, thereafter the reaction is maintained at 78° C. for 4 hours, then the resulted reaction mixture is cooled to room temperature, filtered to remove the coagulum to obtain a core layer seed emulsion having pH=2.3, an average particle size of 170 nm, and a solid content of 13.5%.

A monomer pre-emulsion is made of 3100 g deionized water, 175 g core layer seed latex, 490 g methyl methacrylic acid, 210 g methyl methacrylate and 7 g ethylene glycol dimethacrylate, on the other hand, an initiator solution composed of 70 g of deionized water and 8.4 g of ammonium persulfate is prepared readily for use; 1700 g of deionized water and 175 g of the seed emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 2 hours after the monomer is added, followed by cooling to room temperature, the coagulum is filtrated and removed, the encapsulation buffer layer emulsion having pH=2.3, an average particle size of 324 nm, and a solid content of 12.5% is produced.

A monomer pre-emulsion is made of 1,000 g of styrene, 12 g of ethylene glycol dimethacrylate and 3 g of sodium lauryl sulfate, on the other hand, an initiator solution composed of 300 g of deionized water and 10 g of ammonium persulfate is prepared readily for use; 2200 g of deionized water and 1,350 g of the encapsulation buffer layer emulsion are added to the reactor with nitrogen to get rid of air inside the reaction vessel under stirring in a nitrogen atmosphere and heated to 80° C., the monomer is incorporated in the reactor in 3 hours, at the same time, an ammonium sulfate initiator solution is added in 3.5 hours, the reaction is maintained at 80° C. for 1 hour after the addition of the monomer pre-emulsion, followed by heating to 90° C., adding 150 g of 9.3% ammonia water, cooling to 86° C., keeping at this constant temperature for 2 hours, then cooling down to room temperature, filtrating to remove the coagulum, the hollow polymer particles having pH=9.5, an average particle size of 856 nm, and a solid content of 24.4% is procured.

Example 3

A monomer pre-emulsion comprising 60 g of deionized water, 1.5 g of sodium dodecyl benzene sulfonate, 20 g of methyl methacrylic acid, 40 g of methyl methacrylate and 280 g of butyl acrylate is prepared, on the other hand, an initiator solution comprising 60 g of deionized water and 5 g of ammonium persulfate is prepared readily for use, 2000 g of deionized water and 60.4 g of the monomer pre-emulsion are added to the reactor with nitrogen to get rid of air inside the reaction vessel, maintained at stirring under a nitrogen atmosphere and heated to 78° C., the ammonium persulfate initiator solution is completely added in 0.5 hours, at the same time, the remaining monomer pre-emulsion is added to the reactor in 1.5 hours, thereafter the reaction is maintained at 78° C. for 4 hours, then the resulted reaction mixture is cooled to room temperature, filtered to remove the coagulum to obtain a core layer seed emulsion having pH=2.3, an average particle size of 170 nm, and a solid content of 13.5%.

A monomer pre-emulsion is made of 3100 g deionized water, 175 g core layer seed latex, 490 g methyl methacrylic acid, 210 g methyl methacrylate and 14 g ethylene glycol dimethacrylate, on the other hand, an initiator solution composed of 70 g of deionized water and 8.4 g of ammonium persulfate is prepared readily for use; 1700 g of deionized water and 175 g of the seed emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 2 hours after the monomer is added, followed by cooling to room temperature, the coagulum is filtrated and removed, the encapsulation buffer layer emulsion having pH=2.3, an average particle size of 324 nm, and a solid content of 12.5% is produced.

A monomer pre-emulsion is made of 1,000 g styrene, 12 g ethylene glycol dimethacrylate and 3 g sodium lauryl sulfate, on the other hand, an initiator solution composed of 300 g of deionized water and 10 g of ammonium persulfate is prepared readily for use; 2200 g of deionized water and 1,350 g of the encapsulation buffer layer emulsion are added to the reactor with nitrogen to get rid of air inside the reaction vessel under stirring in a nitrogen atmosphere and heated to 80° C., the monomer is incorporated in the reactor in 3 hours, at the same time, an ammonium sulfate initiator solution is added in 3.5 hours, the reaction is maintained at 80° C. for 1 hour after the addition of the monomer pre-emulsion, followed by heating to 90° C., adding 150 g of 9.3% ammonia water, cooling to 86° C., keeping at this constant temperature for 2 hours, then cooling down to room temperature, filtrating to remove the coagulum, the hollow polymer particles having pH=9.5, an average particle size of 890 nm, and a solid content of 24.3% is procured.

Example 4

A monomer pre-emulsion composition comprising 60 g of deionized water, 1.5 g of sodium dodecyl benzene sulfonate, 20 g of methyl methacrylic acid, 40 g of methyl methacrylate and 280 g of butyl acrylate is prepared, on the other hand, an initiator solution comprising 60 g of deionized water and 5 g of ammonium persulfate is prepared readily for use, 2000 g of deionized water and 60.4 g of the monomer pre-emulsion are added to the reactor with nitrogen to get rid of air inside the reaction vessel, maintained at stirring under a nitrogen atmosphere and heated to 78° C., the ammonium persulfate initiator solution is completely added in 0.5 hours, at the same time, the remaining monomer pre-emulsion is added to the reactor in 1.5 hours, thereafter the reaction is maintained at 78° C. for 4 hours, then the resulted reaction mixture is cooled to room temperature, filtered to remove the coagulum to obtain a core layer seed emulsion having pH=2.3, an average particle size of 170 nm, and a solid content of 13.5%.

A monomer pre-emulsion is made of 3100 g deionized water, 175 g core layer seed latex, 490 g methyl methacrylic acid, 210 g methyl methacrylate and 21 g ethylene glycol dimethacrylate, on the other hand, an initiator solution composed of 70 g of deionized water and 8.4 g of ammonium persulfate is prepared readily for use; 1700 g of deionized water and 175 g of the seed emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 2 hours after the monomer is added, followed by cooling to room temperature, the coagulum is filtrated and removed, the encapsulated buffer layer emulsion having pH=2.3, an average particle size of 324 nm, and a solid content of 12.5% is produced.

A monomer pre-emulsion is made of 1,000 g of styrene, and 3 g of sodium lauryl sulfate, on the other hand, an initiator solution composed of 300 g of deionized water and 10 g of ammonium persulfate is prepared readily for use; 2200 g of deionized water and 1,350 g of the encapsulation buffer layer emulsion are added to the reactor with nitrogen to get rid of air inside the reaction vessel under stirring in a nitrogen atmosphere and heated to 80° C., the monomer is incorporated in the reactor in 3 hours, at the same time, an ammonium sulfate initiator solution is added in 3.5 hours, the reaction is maintained at 80° C. for 1 hour after the addition of the monomer pre-emulsion, followed by heating to 90° C., adding 150 g of 9.3% ammonia water, cooling to 86° C., keeping at this constant temperature for 2 hours, then cooling down to room temperature, filtrating to remove the coagulum, the hollow polymer particles having pH=9.5, an average particle size of 876 nm, and a solid content of 24.1% is procured.

Example 5

A monomer pre-emulsion composition comprising 60 g of deionized water, 1.5 g of sodium dodecyl benzene sulfonate, 20 g of methyl methacrylic acid, 40 g of methyl methacrylate and 280 g of butyl acrylate is prepared, on the other hand, an initiator solution comprising 60 g of deionized water and 5 g of ammonium persulfate is prepared readily for use, 2000 g of deionized water and 60.4 g of the monomer pre-emulsion are added to the reactor with nitrogen to get rid of air inside the reaction vessel, maintained at stirring under a nitrogen atmosphere and heated to 78° C., the ammonium persulfate initiator solution is completely added in 0.5 hours, at the same time, the remaining monomer pre-emulsion is added to the reactor in 1.5 hours, thereafter the reaction is maintained at 78° C. for 4 hours, then the resulted reaction mixture is cooled to room temperature, filtered to remove the coagulum to obtain a core layer seed emulsion having pH=2.3, an average particle size of 170 nm, and a solid content of 13.5%.

A monomer pre-emulsion is made of 3100 g deionized water, 175 g core layer seed latex, 490 g methyl methacrylic acid, 210 g methyl methacrylate and 30 g ethylene glycol dimethacrylate, on the other hand, an initiator solution composed of 70 g of deionized water and 8.4 g of ammonium persulfate is prepared readily for use; 1700 g of deionized water and 175 g of the seed emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 2 hours after the monomer is added, followed by cooling to room temperature, the coagulum is filtrated and removed, the encapsulated buffer layer emulsion having pH=2.3, an average particle size of 324 nm, and a solid content of 12.6% is produced.

A monomer pre-emulsion is made of 1,000 g of styrene, and 3 g of sodium lauryl sulfate, on the other hand, an initiator solution comprising 300 g of deionized water and 10 g of ammonium persulfate is prepared readily for use; 2200 g of deionized water and 1,350 g of the encapsulation buffer layer emulsion are added to the reactor with nitrogen to get rid of air inside the reaction vessel under stirring in a nitrogen atmosphere and heated to 80° C., the monomer is incorporated in the reactor in 3 hours, at the same time, an ammonium sulfate initiator solution is added in 3.5 hours, the reaction is maintained at 80° C. for 1 hour after the addition of the monomer pre-emulsion, followed by heating to 90° C., adding 150 g of 9.3% ammonia water, cooling to 86° C., keeping at this constant temperature for 2 hours, then cooling down to room temperature, filtrating to remove the coagulum, the hollow polymer particles having pH=9.5, an average particle size of 876 nm, and a solid content of 24.2% is procured.

Example 6

A monomer pre-emulsion composition comprising 60 g of deionized water, 1.5 g of sodium dodecyl benzene sulfonate, 20 g of methyl methacrylic acid, 40 g of methyl methacrylate and 280 g of butyl acrylate is prepared, on the other hand, an initiator solution comprising 60 g of deionized water and 5 g of ammonium persulfate is prepared readily for use, 2000 g of deionized water and 60.4 g of the monomer pre-emulsion are added to the reactor with nitrogen to get rid of air inside the reaction vessel, maintained at stirring under a nitrogen atmosphere and heated to 78° C., the ammonium persulfate initiator solution is completely added in 0.5 hours, at the same time, the remaining monomer pre-emulsion is added to the reactor in 1.5 hours, thereafter the reaction is maintained at 78° C. for 4 hours, then the resulted reaction mixture is cooled to room temperature, filtered to remove the coagulum to obtain a core layer seed emulsion having pH=2.3, an average particle size of 170 nm, and a solid content of 13.5%.

A monomer pre-emulsion is made of 3100 g deionized water, 175 g core layer seed latex, 490 g methyl methacrylic acid, 210 g methyl methacrylate and 1.5 g ethylene glycol dimethacrylate, on the other hand, an initiator solution composed of 70 g of deionized water and 8.4 g of ammonium persulfate is prepared readily for use; 1700 g of deionized water and 175 g of the seed emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 2 hours after the monomer is added, followed by cooling to room temperature, the coagulum is filtrated and removed, the encapsulated buffer layer emulsion having pH=2.3, an average particle size of 310 nm, and a solid content of 12.2% is produced.

A monomer pre-emulsion is made of 1,000 g styrene, and 3 g sodium lauryl sulfate, on the other hand, an initiator solution comprising 300 g of deionized water and 10 g of ammonium persulfate is prepared readily for use; 2200 g of deionized water and 1,350 g of the encapsulation buffer layer emulsion are added to the reactor with nitrogen to get rid of air inside the reaction vessel under stirring in a nitrogen atmosphere and heated to 80° C., the monomer is incorporated in the reactor in 3 hours, at the same time, an ammonium sulfate initiator solution is added in 3.5 hours, the reaction is maintained at 80° C. for 1 hour after the addition of the monomer pre-emulsion, followed by heating to 90° C., adding 150 g of 9.3% ammonia water, cooling to 86° C., keeping at constant temperature for 2 hours, then cooling down to room temperature, filtrating to remove the coagulum, the hollow polymer particles having pH=9.5, an average particle size of 820 nm, and a solid content of 24.5% is procured.

Example 7

Following the preparation method of Example 1, except that 1.5 g of sodium dodecyl sulfate is used in the shell encapsulation process, the hollow polymer particles having pH=9.5, an average particle size of 1020 nm, and a solid content of 24.3% are prepared.

Example 8

Following the preparation method of Example 3, except that 1.5 g sodium lauryl sulfate is used in the shell encapsulation process, the hollow polymer particles having pH=9.5, an average particle size of 1,036 nm, and a solid content of 24.3% are prepared.

Example 9

Following the preparation method of Example 4, except that 1.5 g sodium lauryl sulfate is used in the shell encapsulation process, the hollow polymer particles having pH=9.5, an average particle size of 825 nm, and a solid content of 24.1% are prepared.

Example 10

Following the preparation method of Example 4, except that 4.6 g of divinylbenzene is used to replace ethylene glycol dimethacrylate in the buffer layer encapsulation process, 7.9 g of divinylbenzene is used to replace ethylene glycol dimethacrylate in the shell encapsulation, the hollow polymer particles having pH=9.5, an average particle size of 876 nm, and a solid content of 24.2% are prepared.

Example 11

Following the preparation method of Example 3, except that 9.2 g of divinylbenzene is used to replace ethylene glycol dimethacrylate in the buffer layer encapsulation process, 7.9 g of divinylbenzene is used to replace ethylene glycol dimethacrylate in the shell encapsulation process, the hollow polymer particles having pH=9.5, an average particle size of 866 nm, and a solid content of 24.2% are prepared.

Example 12

Following the preparation method of Example 3, except that 13.8 g of divinylbenzene is used to replace ethylene glycol dimethacrylate in the buffer layer encapsulation process, the hollow polymer particles having pH=9.5, an average particle size of 880 nm, and a solid content of 24.1% are prepared.

Comparative Example 1

Following the preparation method of Example 1, except that 21 g of ethylene glycol dimethacrylate is used in the buffer layer encapsulation process, 36 g of ethylene glycol dimethacrylate is used in the shell encapsulation process, the hollow polymer particles having pH=9.5, an average particle size of 756 nm, and a solid content of 24.5% are prepared.

Comparative Example 2

Following the preparation method of Example 1, except that 28 g of ethylene glycol dimethacrylate is used in the buffer layer encapsulation process, 72 g of ethylene glycol dimethacrylate is used in the shell encapsulation process, the hollow polymer particles having pH=9.5, an average particle size of 697 nm, and a solid content of 24.6% are prepared.

Comparative Example 3

A monomer pre-emulsion composition comprising 3,100 g of deionized water, 3 g of sodium dodecyl benzene sulfonate, 490 g of methyl methacrylic acid, and 210 g of methyl methacrylate is prepared, on the other hand, an initiator solution comprising 70 g of deionized water and 8.4 g of ammonium persulfate is prepared readily for use, 1,700 g of deionized water is added to the reactor with nitrogen to get rid of air inside the reaction vessel, maintained at stirring under a nitrogen atmosphere and heated to 80° C., the monomer pre-emulsion is added to the reactor in 3 hours, at the same time, ammonium sulfate initiator solution is completely added in 3.5 hours, the reaction is maintained at 78° C. for 2 hours after the monomer is completely added, thereafter cooling to room temperature, filtrating to remove the coagulum to obtain a core layer seed emulsion having pH=2.6, an average particle size of 305 nm, and a solid content of 12.7%.

A monomer pre-emulsion is made of 1,000 g styrene, 48 g ethylene glycol dimethacrylate and 3.5 g sodium dodecyl sulfate, on the other hand, an initiator solution composed of 300 g of deionized water and 10 g of ammonium persulfate is prepared readily for use; 2,200 g of deionized water and 1,350 g of the core layer emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 1 hour after the monomer pre-emulsion is added, followed by heating to 90° C., adding 150 g 9.3% ammonia, cooling down to 86° C., keeping at constant temperature of 86° C. for 2 hours, then cooling to room temperature, the coagulum is filtrated and removed, the hollow polymer particles having pH=9.5, an average particle size of 765 nm, and a solid content of 24.7% are produced.

Comparative Example 4

A monomer pre-emulsion composition comprising 3,100 g of deionized water, 3 g of sodium dodecyl benzene sulfonate, 490 g of methyl methacrylic acid, and 210 g of methyl methacrylate is prepared, on the other hand, an initiator solution comprising 70 g of deionized water and 8.4 g of ammonium persulfate is prepared readily for use, 1,700 g of deionized water is added to the reactor with nitrogen to get rid of air inside the reaction vessel, maintained at stirring under a nitrogen atmosphere and heated to 80° C., the monomer pre-emulsion is added to the reactor in 3 hours, at the same time, ammonium sulfate initiator solution is completely added in 3.5 hours, the reaction is maintained at 80° C. for 2 hours after the monomer is completely added, thereafter cooling to room temperature, filtrating to remove the coagulum to obtain a core layer seed emulsion having pH=2.6, an average particle size of 305 nm, and a solid content of 12.7%.

A monomer pre-emulsion is made of 1,000 g styrene, 120 g ethylene glycol dimethacrylate and 3.5 g sodium dodecyl sulfate, on the other hand, an initiator solution composed of 300 g of deionized water and 10 g of ammonium persulfate is prepared readily for use; 2,200 g of deionized water and 1,350 g of the core layer emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 1 hour after the monomer pre-emulsion is added, followed by heating to 90° C., adding 150 g 9.3% ammonia, cooling down to 86° C., keeping at constant temperature of 86° C. for 2 hours, then cooling to room temperature, the coagulum is filtrated and removed, the hollow polymer particles having pH=9.5, an average particle size of 560 nm, and a solid content of 25.9% are produced.

Comparative Example 5

A monomer pre-emulsion composition comprising 3,100 g of deionized water, 3 g of sodium dodecyl benzene sulfonate, 490 g of methyl methacrylic acid, 210 g of methyl methacrylate and 28 g of ethylene glycol dimethacrylate, is prepared, on the other hand, an initiator solution comprising 70 g of deionized water and 8.4 g of ammonium persulfate is prepared readily for use, 1,700 g of deionized water is added to the reactor with nitrogen to get rid of air inside the reaction vessel, maintained at stirring under a nitrogen atmosphere and heated to 80° C., the monomer pre-emulsion is added to the reactor in 3 hours, at the same time, ammonium sulfate initiator solution is completely added in 3.5 hours, the reaction is maintained at 80° C. for 2 hours after the monomer is completely added, thereafter cooling to room temperature, filtrating to remove the coagulum to obtain a core layer seed emulsion having pH=2.6, an average particle size of 324 nm, and a solid content of 13.1%.

A monomer pre-emulsion is made of 1,000 g styrene, 48 g ethylene glycol dimethacrylate and 3.5 g sodium dodecyl sulfate, on the other hand, an initiator solution comprising 300 g of deionized water and 10 g of ammonium persulfate is prepared readily for use; 2,200 g of deionized water and 1,350 g of the core layer emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 1 hour after the monomer pre-emulsion is added, followed by heating to 90° C., adding 150 g 9.3% ammonia, cooling down to 86° C., keeping at constant temperature of 86° C. for 2 hours, then cooling to room temperature, the coagulum is filtrated and removed, the hollow polymer particles having pH=9.5, an average particle size of 725 nm, and a solid content of 25.2% are produced.

Comparative Example 6

A monomer pre-emulsion composition comprising 3,100 g of deionized water, 3 g of sodium dodecyl benzene sulfonate, 490 g of methyl methacrylic acid, 210 g of methyl methacrylate and 28 g of ethylene glycol dimethacrylate is prepared, on the other hand, an initiator solution comprising 70 g of deionized water and 8.4 g of ammonium persulfate is prepared readily for use, 1,700 g of deionized water is added to the reactor with nitrogen to get rid of air inside the reaction vessel, maintained at stirring under a nitrogen atmosphere and heated to 80° C., the monomer pre-emulsion is added to the reactor in 3 hours, at the same time, ammonium sulfate initiator solution is completely added in 3.5 hours, the reaction is maintained at 80° C. for 2 hours after the monomer is completely added, thereafter cooling to room temperature, filtrating to remove the coagulum to obtain a core layer seed emulsion having pH=2.3, an average particle size of 324 nm, and a solid content of 13.1%.

A monomer pre-emulsion is made of 1,000 g of styrene, 120 g of ethylene glycol dimethacrylate and 3.5 g of sodium dodecyl sulfate, on the other hand, an initiator solution comprising 300 g of deionized water and 10 g of ammonium persulfate is prepared readily for use; 2,200 g of deionized water and 1,350 g of the core layer emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 1 hour after the monomer pre-emulsion is added, followed by heating to 90° C., adding 150 g 9.3% ammonia, cooling down to 86° C., keeping at constant temperature of 86° C. for 2 hours, then cooling to room temperature, the coagulum is filtrated and removed, the hollow polymer particles having pH=9.5, an average particle size of 580 nm, and a solid content of 26.1% are produced.

Comparative Example 7

A monomer pre-emulsion composition comprising 3,100 g of deionized water, 3 g of sodium dodecyl benzene sulfonate, 490 g of methyl methacrylic acid, 210 g of methyl methacrylate and 35 g of ethylene glycol dimethacrylate is prepared, on the other hand, an initiator solution comprising 70 g of deionized water and 8.4 g of ammonium persulfate is prepared readily for use, 1,700 g of deionized water is added to the reactor with nitrogen to get rid of air inside the reaction vessel, maintained at stirring under a nitrogen atmosphere and heated to 80° C., the monomer pre-emulsion is added to the reactor in 3 hours, at the same time, ammonium sulfate initiator solution is completely added in 3.5 hours, the reaction is maintained at 80° C. for 2 hours after the monomer is completely added, thereafter cooling to room temperature, filtrating to remove the coagulum to obtain a core layer seed emulsion having pH=2.3, an average particle size of 324 nm, and a solid content of 13.1%.

A monomer pre-emulsion is made of 1,000 g of styrene, 48 g of ethylene glycol dimethacrylate and 3.5 g of sodium dodecyl sulfate, on the other hand, an initiator solution composed of 300 g of deionized water and 10 g of ammonium persulfate is prepared readily for use; 2,200 g of deionized water and 1,350 g of the core layer emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 1 hour after the monomer pre-emulsion is added, followed by heating to 90° C., adding 150 g 9.3% ammonia, cooling down to 86° C., keeping at constant temperature of 86° C. for 2 hours, then cooling to room temperature, the coagulum is filtrated and removed, the hollow polymer particles having pH=9.5, an average particle size of 736 nm, and a solid content of 25.2% are produced.

Comparative Example 8

A monomer pre-emulsion composition comprising 3,100 g of deionized water, 3 g of sodium dodecyl benzene sulfonate, 490 g of methyl methacrylic acid, 210 g of methyl methacrylate and 35 g of ethylene glycol dimethacrylate is prepared, on the other hand, an initiator solution comprising 70 g of deionized water and 8.4 g of ammonium persulfate is prepared readily for use, 1,700 g of deionized water is added to the reactor with nitrogen to get rid of air inside the reaction vessel, maintained at stirring under a nitrogen atmosphere and heated to 80° C., the monomer pre-emulsion is added to the reactor in 3 hours, at the same time, ammonium sulfate initiator solution is completely added in 3.5 hours, the reaction is maintained at 80° C. for 2 hours after the monomer is completely added, thereafter cooling to room temperature, filtrating to remove the coagulum to obtain a core layer seed emulsion having pH=2.3, an average particle size of 324 nm, and a solid content of 13.1%.

A monomer pre-emulsion is made of 1,000 g of styrene, 120 g of ethylene glycol dimethacrylate and 3.5 g of sodium dodecyl sulfate, on the other hand, an initiator solution composed of 300 g of deionized water and 10 g of ammonium persulfate is prepared readily for use; 2,200 g of deionized water and 1,350 g of the core layer emulsion are added to the reactor, air within the reaction vessel is purged by nitrogen, the reaction mixture is stirred and heated to 80° C. under a nitrogen atmosphere, the monomer pre-emulsion is incorporated to the reactor in 3 hours, at the same time, an ammonium persulfate initiator solution is added in 3.5 hours, the reaction is maintained at 80° C. for 1 hour after the monomer pre-emulsion is added, followed by heating to 90° C., adding 150 g 9.3% ammonia, cooling down to 86° C., keeping at constant temperature of 86° C. for 2 hours, then cooling to room temperature, the coagulum is filtrated and removed, the hollow polymer particles having pH=9.5, an average particle size of 565 nm, and a solid content of 26.1% is produced.

The determination of the particle integrity in the above mentioned examples and comparative examples includes drying particles, and observing with a scanning electron microscope.

The following processing tests on examples and comparative examples are assessed in accordance with the following methods.

The preparation of the coating processing liquid:

| Material | Amount |
| --- | --- |
| Water-based acrylic resin | 25 |
| Calcium carbonate slurry | 50 |
| Polymer microspheres | 5 |
| Processing aids | 2 |
| Water | 18 |

The processing liquid is coated on a plastic substrate, after drying, gloss, whiteness, opacity and printing color density are assessed.

<Gloss Evaluation Method>

Gloss is measured with BYK-Gardner micro-gloss 75° gloss meter to comply with International Paper Measurement Standards—TAPPI T480.

<Whiteness Evaluation Method>

Whiteness is measured with TECHNIDYNE Micro TB-1C leucometer/opaque meter to comply with International Paper Measurement Standards—TAPPI T525.

<Opacity Evaluation Method>

Opacity is measured with TECHNIDYNE Micro TB-1C opaque meter to comply with International Paper Measurement Standards—TAPPI T425.

<Printed Color Density Evaluation Method>

The color density is measured with TECHKON R410e to meet the printing color density measurement standard—DIN 16 536.

TABLE 1

The difference in formulas and physical properties between examples and comparative examples

| Process | raw materials | example | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| Preparation of the core layer | methacrylic acid | 20 | 20 | 20 | 20 | 20 | 20 | 20 | 20 | 20 | 20 |
| | methyl-methacrylate | 40 | 40 | 40 | 40 | 40 | 40 | 40 | 40 | 40 | 40 |
| | Butyl acrylate | 280 | 280 | 280 | 280 | 280 | 280 | 280 | 280 | 280 | 280 |
| | Ethylene glycol dimethacrylate | — | — | — | — | — | — | — | — | — | — |

TABLE 1-continued

The difference in formulas and physical properties between examples and comparative examples

|  |  |  |  |  |  |  |  |  |  |  |  |
|---|---|---|---|---|---|---|---|---|---|---|---|
|  | Sodium dodecyl benzene sulfonate | 1.5 | 1.5 | 1.5 | 1.5 | 1.5 | 1.5 | 1.5 | 1.5 | 1.5 | 1.5 |
| Preparation of the en-capsulation buffer layer | core layer emulsion*1 | 175 | 175 | 175 | 175 | 175 | 175 | 175 | 175 | 175 | 175 |
|  | methacrylic acid | 490 | 490 | 490 | 490 | 490 | 490 | 490 | 490 | 490 | 490 |
|  | Methyl methacrylate | 210 | 210 | 210 | 210 | 210 | 210 | 210 | 210 | 210 | 210 |
|  | Ethylene glycol dimethacrylate | 7 | 7 | 14 | 21 | 30 | 1.5 | 7 | 14 | 21 | — |
|  | Divinylbenzene | — | — | — | — | — | — | — | — | — | 4.6 |
| shell en-capsulation preparation | buffer layer emulsion*2 | 1,350 | 1,350 | 1,350 | 1,350 | 1,350 | 1,350 | 1,350 | 1,350 | 1,350 | 1,350 |
|  | Styrene | 1000 | 1000 | 1000 | 1000 | 1000 | 1000 | 1000 | 1000 | 1000 | 1000 |
|  | Ethylene glycol dimethacrylate | 12 | 24 | 12 | — | — | 36 | 12 | 12 | — | — |
|  | Divinylbenzene | — | — | — | — | — | — | — | — | — | 7.9 |
|  | Sodium lauryl sulfate | 3 | 3 | 3 | 3 | 3 | 3 | 1.5 | 1.5 | 1.5 | 3 |
| Particle size (nm) |  | 866 | 856 | 890 | 876 | 870 | 820 | 1020 | 1036 | 825 | 876 |
| Particle integrity*3 |  | ◎ | ◎ | ◎ | ◎ | ○ | ○ | ◎ | ◎ | ○ | ◎ |
| Gloss |  | 23 | 24 | 25 | 24 | 24 | 23 | 23 | 24 | 23 | 25 |
| Whiteness |  | 93 | 94 | 94 | 93 | 93 | 93 | 94 | 93 | 94 | 94 |
| Opacity |  | 96 | 96 | 96 | 96 | 96 | 96 | 96 | 96 | 96 | 96 |
| Concentration of the printing color (blue) |  | 0.42 | 0.4 | 0.41 | 0.4 | 0.4 | 0.4 | 0.41 | 0.4 | 0.36 | 0.41 |
| Concentration of the printing color (green) |  | 0.06 | 0.06 | 0.06 | 0.06 | 0.06 | 0.06 | 0.06 | 0.06 | 0.05 | 0.06 |
| Concentration of the printing color (red) |  | 1.2 | 1.18 | 1.22 | 1.2 | 1.2 | 1.2 | 1.21 | 1.21 | 1.18 | 1.2 |

|  |  | example | | comparative example | | | | | | | |
|---|---|---|---|---|---|---|---|---|---|---|---|
| Process | raw materials | 11 | 12 | 1 | 2 | 3 | 4 | 5 | 6 | 7 | 8 |
| Preparation of the core layer | methacrylic acid | 20 | 20 | 20 | 20 | 490 | 490 | 490 | 490 | 490 | 490 |
|  | methyl-methacrylate | 40 | 40 | 40 | 40 | 210 | 210 | 210 | 210 | 210 | 210 |
|  | Butyl acrylate | 280 | 280 | 280 | 280 | — | — | — | — | — | — |
|  | Ethylene glycol dimethacrylate | — | — | — | — | — | — | 28 | 28 | 35 | 35 |
|  | Sodium dodecyl benzene sulfonate | 1.5 | 1.5 | 1.5 | 1.5 | 3 | 3 | 3 | 3 | 3 | 3 |
| Preparation of the en-capsulation buffer layer | core layer emulsion*1 | 175 | 175 | 175 | 175 | — | — | — | — | — | — |
|  | methacrylic acid | 490 | 490 | 490 | 490 | — | — | — | — | — | — |
|  | Methyl methacrylate | 210 | 210 | 210 | 210 | — | — | — | — | — | — |
|  | Ethylene glycol dimethacrylate | — | — | 21 | 28 | — | — | — | — | — | — |
|  | Divinylbenzene | 9.2 | 13.8 | — | — | — | — | — | — | — | — |
| shell en-capsulation preparation | buffer layer emulsion*2 | 1,350 | 1,350 | 1,350 | 1,350 | 1,350 | 1,350 | 1,350 | 1,350 | 1,350 | 1,350 |
|  | Styrene | 1000 | 1000 | 1000 | 1000 | 1000 | 1000 | 1000 | 1000 | 1000 | 1000 |
|  | Ethylene glycol dimethacrylate | — | — | 36 | 72 | 48 | 120 | 48 | 120 | 48 | 120 |
|  | Divinylbenzene | 7.9 | — | — | — | — | — | — | — | — | — |
|  | Sodium lauryl sulfate | 3 | 3 | 3 | 3 | 3.5 | 3.5 | 3.5 | 3.5 | 3.5 | 3.5 |
| Particle size (nm) |  | 866 | 880 | 756 | 697 | 765 | 560 | 725 | 580 | 736 | 565 |
| Particle integrity*3 |  | ◎ | ◎ | Δ | Δ | Δ | X | Δ | X | Δ | X |
| Gloss |  | 24 | 25 | 20 | 21 | 23 | 22 | 23 | 21 | 22 | 21 |
| Whiteness |  | 94 | 93 | 93 | 93 | 93 | 92 | 93 | 92 | 93 | 92 |

TABLE 1-continued

The difference in formulas and physical properties between examples and comparative examples

| | | | | | | | | | | |
|---|---|---|---|---|---|---|---|---|---|---|
| Opacity | 96 | 96 | 96 | 95 | 95 | 94 | 94 | 94 | 94 | 93 |
| Concentration of the printing color (blue) | 0.4 | 0.4 | 0.36 | 0.33 | 0.36 | 0.3 | 0.36 | 0.31 | 0.35 | 0.3 |
| Concentration of the printing color (green) | 0.06 | 0.06 | 0.05 | 0.04 | 0.02 | 0.03 | 0.05 | 0.03 | 0.04 | 0.03 |
| Concentration of the printing color (red) | 1.17 | 1.18 | 1.16 | 1.17 | 1.13 | 1.0 | 1.12 | 1.01 | 1.1 | 1.02 |

[1]The emulsion solid content of the core layer: 13.5%
[2]The solid content of the buffer layer emulsion: 12.2% to 12.6%
[3]The particles integrity: ⊚ best, ○ complete, Δ poor, X bad

What we claimed is:

1. A process for preparation of three-stage polymer microspheres having a hollow body in first stage as well as a buffer layer with a porous sponge-like structure in second stage, consisting of the following steps:

(1) preparation of a core layer in absence of cross-linking agent:

which preparation process is prepared by reacting an acrylic acid (ester) based monomer with an emulsifier 0.5%-1.0% by weight of the acrylic acid (ester) based monomer via an emulsion polymerization reaction in a semi-continuous feeding mode to obtain a core layer emulsion having desired size of latex particles formed as the core layer; wherein the acrylic acid (ester) based monomer is selected from the group consisting of acrylic acid, methacrylic acid, methyl acrylate, methyl methacrylate, ethyl acrylate, butyl acrylate and ethyl hexyl acrylate;

(2) preparation of an encapsulation buffer layer covered on the core layer particularly no additional emulsifier added:

which preparation process is prepared by reacting the aforementioned core layer emulsion of step (1) with acrylate based monomers and acid functional acrylic monomers in the presence of a bifunctional cross-linking agent via an emulsion polymerization to obtain acidic polymer particles having the core layer coated with a desired thickness of the buffer layer; wherein the core layer emulsion solid content accounts for 1-10% of the total weight of the buffer layer, the acid functional acrylic monomer accounts for 10 to 90% of the total weight of the buffer layer and the balance is the acrylate based monomers; and wherein the acid functional acrylic monomer is selected from the group consisting of acrylic acid, methacrylic acid, maleic acid and fumaric acid; and (3) preparation of a hydrophobic shell encapsulation layer covered on the acidic polymer particle and in treatment of alkali swelling to produce hollow microspheres:

which preparation process is prepared by reacting acidic polymer particles of step (2) with a non-ionic monoethylene monomer, with or without a cross-linking agent having bi-, tri-, or multi-functional groups, via an emulsion polymerization to obtain a resulted polymer microspheres having the acidic polymer particle coated with a hydrophobic shell encapsulation layer, and the polymer microspheres are via an alkali swelling treated with volatile alkali to produce the final microspheres having the core layer expanded and neutralized as said hollow body as well as the buffer layer and the hydrophobic shell encapsulation layer both penetrated as said porous sponge-like structure; wherein the buffer layer solid content accounts for 10 to 40 percent of the total solid content weight; and wherein the non-ionic mono-vinyl monomer is selected from the group consisting of styrene, α-methyl styrene, vinyl toluene, ethylene, vinyl acetate and acrylonitrile.

2. The process for preparation of three-stage polymer microspheres as claimed in claim 1, wherein the bifunctional cross-linking agent of step (2) accounts for 0.1-2 mole % of the total monomers in the buffer layer, and selected from the group consisting of ethylene glycol diacrylate, ethylene glycol dimethacrylate, 1,3-butanediol diacrylate, 1,4-butanediol diacrylate, propylene glycol diacrylate, triethylene glycol dimethacrylate and divinylbenzene.

3. The process for preparation of three-stage polymer microspheres as claimed in claim 1, wherein the cross-linking agent of step (3) accounts for 0-2 mole % of the total monomers in the shell encapsulation layer, and selected from the group consisting of ethylene glycol diacrylate, ethylene glycol dimethacrylate, 1,3-butanediol diacrylate, 1,4-butanediol diacrylate, propylene glycol diacrylate, triethylene glycol dimethacrylate, 1,1,1-tris(hydroxymethyl) propane methacrylate, pentaerythritol trimethyl acrylate and divinyl benzene.

* * * * *